United States Patent [19]

Di Giulio

[11] 3,862,307

[45] Jan. 21, 1975

[54] DENTIFRICES CONTAINING A CATIONIC THERAPEUTIC AGENT AND IMPROVED SILICA ABRASIVE

[75] Inventor: David Neil Di Giulio, Cincinnati, Ohio

[73] Assignee: The Procter & Gamble Co., Cincinnati, Ohio

[22] Filed: Apr. 9, 1973

[21] Appl. No.: 349,366

[52] U.S. Cl................. 424/52, 106/35, 423/335
[51] Int. Cl. ......................... A61k 7/16, C09k 3/00
[58] Field of Search ................ 106/35; 424/49, 52; 423/335

[56] References Cited
UNITED STATES PATENTS 3,538,230  11/1970  Pader et al............................ 424/50
3,669,624   6/1972  Warthon et al..................... 423/335

Primary Examiner—Morris Liebman
Assistant Examiner—S. L. Fox
Attorney, Agent, or Firm—Ronald L. Hofer; Douglas C. Mohl; Richard C. Witte

[57] ABSTRACT

Dentifrices contain water, a cationic therapeutic agent, and an amorphous silica abrasive which has been pretreated with hydrofluoric acid. Preferably, the cationic therapeutic agent is a metal cation such as indium ion. The pretreated abrasive has improved compatability with cationic agents so that less cationic therapeutic agent is adsorbed by the abrasive and more is available for treatment of the teeth.

7 Claims, No Drawings

3,862,307

DENTIFRICES CONTAINING A CATIONIC THERAPEUTIC AGENT AND IMPROVED SILICA ABRASIVE

FIELD OF THE INVENTION

This invention relates to aqueous therapeutic dentifrice compositions wherein the abrasive is pretreated to have improved compatibility with cationic therapeutic agents.

DESCRIPTION OF THE PRIOR ART

A satisfactory dentifrice should have a cosmetic effect on the teeth, keeping them light colored. It should also have a functional effect on the teeth and mouth, keeping them clean and free from food debris, thereby aiding in prevention of tooth decay. In order to achieve both ends, it is necessary to brush with a dentifrice containing a cleaning agent, often called an abrasive. The purpose of the cleaning agent is to aid in removal of the tightly adherent film which, in many persons, contains pigments which color it brown or yellow. The cleaning agent should remove this pellicle film with a minimum of abrasion of the underlying tooth material. Enamel, which covers much of the exposed tooth surface, is relatively hard and is not of as much concern as the softer dentin which may be exposed by receding gums. The ideal cleaning agent is one which effects the maximum removal of the pellicle film with the minimal abrasion of dentin. Various forms of amorphous silica such as silica xerogel are well known in the prior art as particularly suitable abrasives.

Beyond the function of a dentifrice in maintaining oral cleanliness, there is merit in including an agent which acts specifically to reduce tooth decay. Work stimulated by the discovery of the beneficial effect of fluoride in drinking water or topically applied to the teeth has led to the development of dentifrices containing stannous fluoride. Both the stannous ions and the fluoride ions are believed to contribute to the anticaries effect. Further work has led to the discovery of even more effective anti-caries dentifrices containing indium fluoride. Again, both the indium ion and the fluoride ion are believed to contribute to the anti-caries effect.

A problem recognized in the scientific and patent literature is that of formulating a dentifrice in which the ionic anti-caries agent will remain available for treatment of the teeth in use rather than reacting with or being adsorbed by the cleaning agent.

The use of silica gel abrasives in dentifrice compositions is well known in the prior art. However, heretofore, such abrasives were of limited utility in dentifrices containing cationic active ingredients because the abrasive adsorbed the cationic active, thus reducing the efficacy of the dentifrice.

An object of this invention is to provide a preferred dentifrice in which a substantial amount of the cationic therapeutic agent is not adsorbed by the abrasive and thus remains available for therapeutic treatment of the tooth surfaces on use. This object is achieved by the use of an amorphous silica abrasive which has been pretreated to improve its compatibility with cationic therapeutic agents.

Silica gel is a form of amorphous silica often employed in the prior art for its adsorptive and catalytic properties, and much prior art research has been directed at increasing the adsorptive capacity or catalytic activity of silica gel. However, the prior art also teaches that the adsorptive capacity of a silica gel may be decreased as well as increased. Dubinin, "Analysis of the Experimental Data for Silica Gels With a Chemically Modified Surface," Izv. Ahad. Nauk SSSR, Otd. Khim, Nauk 1960, 1739–50, teaches that silica gels are less adsorptive toward vapors of non-polar substances when the hydroxyl groups of the silica gels are displaced by fluoride or methyl groups. Dubinin, et al., "Adsorption of Vapors on Adsorbents With a Heterogeneous Surface," Izvest. Akad, Nauk SSSR, Otdel, Khim, Nauk 1960, 588–98, teaches that the displacement of the hydroxyl groups of a silica gel by fluoride decreases the adsorptive capacity toward nitrogen, argon, benzene, water, and cyclohexane. However, the prior art does not disclose nor suggest the advantages resulting from the treatment of a silica gel abrasive with hydrofluoric acid prior to incorporating the abrasive into an aqueous dentifrice formulation. Further, the prior art does not teach of suggest the improved aqueous dentifrice formulations resulting from incorporation of such improved abrasives into dentifrices containing cationic therapeutic agents.

U.S. Pat. No. 3,538,230, Nov. 30, 1972, to Pader, et al., discloses dentifrice compositions comprising stannous ions, fluorine ions, and a silica xerogel. However, this reference does not teach dentifrice compositions containing abrasives pretreated with hydrofluoric acid so as to have improved abrasive-cationic agent compatibility.

SUMMARY OF THE INVENTION

The present invention relates to therapeutic dentifrice compositions having a pH of below about 5 and comprising water, a cationic therapeutic agent, and an amorphous silica abrasive which has been pretreated with hydrofluoric acid at below about pH 4. Preferred cationic therapeutic agents are metal cations, for example, indium ion, stannous ion, and calcium ion. The pretreated abrasive has improved compabitility with cationic agents so that less cationic therapeutic agent is adsorbed by the abrasive and more is available for treatment of the teeth. The improved abrasive-cationic agent compatibility of the present dentifrice compositions results only if the abrasive is pretreated with hydrofluoric acid at a pH of below about pH 4 and the dentifrice composition has a pH of below about pH 5.

PREFERRED EMBODIMENTS OF THE INVENTION

The present invention relates to dentifrice compositions comprising water, a cationic therapeutic agent and a pretreated amorphous silica abrasive. The amorphous silica abrasive is pretreated to improve compatibility between the abrasive and the cationic therapeutic agent. More specifically, the amorphous silica abrasive is pretreated with hydrofluoric acid to reduce its capacity to adsorb the cationic therapeutic agent. When the pretreated abrasive is incorporated into a dentifrice, more cationic therapeutic agent is available for treatment of the teeth because less is adsorbed by the abrasive.

It is believed that all amorphous silica abrasives can be successfully treated with hydrofluoric acid to reduce their capacity to adsorb cationic agents. Amorphous silica, including silica gels, nonporous precipitates, and pyrogenic materials, can be considered polycondensation products of orthosilicic acid, $Si(OH)_4$. The physical structure of amorphous silica is represented by a system of polycondensation units or primary particles, the size and packing of which determine the exact geometry of the structure. This structure, as defined by surface area, pore volume, and pore size, depends on the size and degree of packing of the elementary or ultimate particles. The latter consist of dimensional networks of $SiO_4$ tetrahedra. The only difference between gels and precipitates is the degree in strength of packing and the silica aggregates.

While applicant does not wish to be bound to any theory, it is believed that the present treatment neutralizes reactive silanol, i.e., Si—OH, groups on the surface of the silica abrasive by replacing the hydroxyl groups with fluoride ion. As the resulting Si—F bond is not as attractive to cationic agents as is a silanol group, the capacity of the silica abrasive to adsorb cationic agents is reduced.

Amorphous silica abrasives suitable for use in the present invention must have cleansing ability and be safe for use in the oral cavity. Cleansing ability depends on the interrelated factors of hardness, particle size, shape, and structure. Safety requires that these be such that the abrasives can penetrate and remove stain and debris from, on, and around the tooth without scratching or otherwise harming the enamel surface of the tooth, the tooth's dentin, or the adjacent soft tissues under normal conditions of toothbrushing. The literature has disclosed the use of various natural and synthetic silicas as abrasives and polishing agents in various compositions including dentifrices, either alone or in combination with other polishing agents. See, for example, German Pat. No. 974,958; French Pat. No. 1,130,627; British Pat. No. 995,351; Swiss Pat. No. 280,671; and U.S. Pat. Nos. 3,250,680; 3,538,230; 3,662,059; and 3,689,637.

Preferred amorphous silica abrasives for use in the present invention are synthetic, amorphous, porous silica xerogels having an average particle size of from 2 to about 30 microns.

Examples of preferred xerogel abrasives which are commercially available are the materials sold by W. R. Grace & Co., Davison Chemical Division, under the names Syloid 63, Syloid 65, Syloid 72 (including grades 72, 73 and 79), Syloid 74, Syloid 75, Syloid 620, Syloid 244 and Syloid 621. These materials are defined in a brochure of Davison entitled "DAVISON FAMILY OF SYLOID SILICAS AS WORK", PA59-71, incorporated herein by reference.

Syloid 63 has a particle size of about 9 microns, a surface area of about 675 $m^2/gm.$, oil absorption of about 60 lb./100 lb., a bulk density of about 29 lb./ft.$^3$, a silica particle density of about 1.05 gms/c.c., and an average pore diameter of about 25 Angstroms.

Syloid 65 has a particle size of about 4.5 microns, a surface area of about 695 $m^2/gm.$, oil absorption of about 75 lb./100 lb., a bulk density of about 23 lb./ft.$^2$, a silica particle density of about 1.05 gms/c.c., and an average pore diameter of about 25 Angstroms.

Syloid 72, grade 72, has a particle size of about 4 microns, a surface area of about 340 $m^2/gm.$, oil absorption of about 220 lb./100 lb., a bulk density of about 11 lb./ft.$^3$, a silica particle density of about 0.65 gms/c.c., and an average pore diameter of about 150 Angstroms.

Syloid 72, grade 73, has a particle size of about 4 microns, a surface area of about 330 $m^2/gm.$, oil absorption of about 200 lb./100 lb., a bulk density of about 9 lb./ft.$^3$, a silica particle density of about 0.65 gms/c.c., and an average pore diameter of about 150 Angstroms.

Syloid 72, grade 79, has a particle size of about 4 microns, a surface area of about 340 $m^2/gm.$, oil absorption of about 220 lb./100 lb., a bulk density of about 11 lb./ft.$^3$, a silica particle density of about 0.65 gms/c.c., and an average pore diameter of about 150 Angstroms.

Syloid 74 has a particle size of about 8 microns, a surface area of about 320 $m^2/gm.$, oil absorption of about 200 lb./100 lb., a bulk density of about 16 lb./ft.$^3$, a silica particle density of about 0.65 gms/c.c., and an average pore diameter of about 150 Angstroms.

Syloid 75 has a particle size of about 2.6 microns, a surface area of about 360 $m^2/gm.$, oil absorption of about 215 lb./100 lb., a bulk density of about 10 lb./ft.$^3$, a silica particle density of about 0.65 gms/c.c., and an average pore diameter of about 150 Angstroms.

Syloid 620 has a particle size of about 20 microns, a surface area of about 320 $m^2/gm.$, oil absorption of about 180 lb./100 lb., a bulk density of about 21 lb./ft.$^3$, a silica particle density of about 0.65 gms/c.c., and an average pore diameter of about 150 Angstroms.

Syloid 621 has a particle size of about 25 microns, a surface area of about 320 $m^2/gm.$, oil absorption of about 180 lb./100 lb., a bulk density of about 23 lb./ft.$^3$, a silica particle density of about 0.65 gms/c.c., and an average pore diameter of about 150 Angstroms.

Most preferred xerogels are those having densities greater than about 1 gm/c.c. and surface areas of greater than about 600 $m^2/gm$. The cleaning ability of these particles is much greater than the cleaning ability of those xerogels having densities of about 0.65 gms/c.c. and surface areas of closer to 300 $m^2/gm$. However the lower density abrasives have much lower RDA (Radioactive Dentin Abrasion) values and thus damage to the tooth is minimized. In general, higher RDA values are associated with better cleaning. Mixtures of 1 gm/c.c. density and 0.65 gm/c.c. density xerogel abrasives are desirable from the standpoint of arriving at a compromise position for cleaning while maintaining acceptable physical properties for the compositions.

Also preferred amorphous silica abrasives are precipitated amorphous silica abrasives such as those supplied by the J. M. Huber Corporation under the trade name Zeosyl. Specific examples of preferred abrasives are Zeosyl 49 and Experimental Zeosyl XP-303.

The amorphous silica abrasive may be from about 10 to about 50 percent by weight of the dentifrice composition. However, it is preferred that the abrasive be from about 12 to about 40 percent by weight of the dentifrice composition.

It is within the scope of the present invention to employ suitable amorphous silica abrasives in combination with other abrasives or polishing agents such as alumina or synthetic resins. Whenever a dentifrice contains an amorphous silica abrasive having reactive silanol groups exposed, in solution, to cationic therapeutic agents, pretreatment of the abrasive with hydrofluoric acid will improve abrasive-cationic agent compatibility.

The pretreatment of the amorphous silica abrasive is carried out in aqueous solution and is preferentially carried out prior to the addition of cationic ingredients to the dentifrice compositions, but it is believed that the treatment would improve abrasive-cationic agent compatibility even if carried out after the cationic agents were added to the dentifrice.

The amount of hydrofluoric acid employed to treat the silica abrasive is not critical, and it is believed that even trace amounts of hydrofluoric acid will have a significant effect on the cation adsorbing capacity of amorphous silica abrasive. Greater effects will be observed at lower pH's, particularly below pH 3, i.e., as the pH of the treatment solution is lowered, less hydrofluoric acid is required for effective treatment. The upper limit of hydrofluoric acid employed to pretreat the amorphous silica abrasive is imposed by safety requirements. The quantity of hydrofluoric acid employed must be small enough that a physiologically safe amount of fluoride ion remains in solution in the dentifrice composition.

In order to obtain the improved abrasive-cationic agent compatibility of the present invention, the treatment solution which comprises amorphous silica abrasive, water and hydrofluoric acid, must have a pH of less than about pH 4. After the amorphous silica abrasive has been treated, the pH of the amorphous silica containing solution may be permitted to increase to about pH 5 without losing the advantageous abrasive-cationic agent compatibility offered by the present invention.

In order for the amorphous silica gel to be effectively preheated, a certain amount of time must be allowed for the pretreatment reaction to occur. This time period is not critical; however, it is believed that at least about 5 minutes is required for an effective treatment, and that about 30 minutes is preferred. It is further believed that there is no advantage allowing the treatment reaction to continue for longer than about 60 minutes.

Dentifrice compositions of the present invention comprise, in addition to pretreated amorphous silica abrasive and water, an effective amount of a cationic therapeutic agent. Preferred cationic therapeutic agents are metal cations such as stannous ion, indium, and calcium ion. Indium ion is the most preferred cationic therapeutic agent.

The dentifrice of this invention may also contain one or more other optional ingredients well known for use in toothpastes and toothpowders. Without limitation, these include the following: Water; soaps and synthetic detergents, e.g., water-soluble alkyl and alkyl ether sulfates and sulfonates having alkyl groups with 8 to 18 carbon atoms, water-soluble salts of sulfonated monoglycerides of fatty acids having from 10 to 18 carbon atoms, water-soluble salts of sulfated fatty alcohols having from 10 to 18 carbon atoms, salts of fatty acid amides of taurines, such as sodium-N-methyl-N-palmitoyl tauride, salts of fatty acid esters of isethionic acid, and substantially saturated aliphatic acyl amides of saturated aliphatic monoamino carboxylic acids having 2 to 6 carbon atoms and in which the acyl radical contains 12 to 16 carbon atoms, such as sodium N-lauroyl sarcoside; flavoring agents; oxygen-releasers, e.g., perborate; buffers, sweeteners, e.g., saccharin; humectants; preservatives; coloring materials, carriers and softeners, e.g., glycerin, sorbitol, ethyl alcohol, mineral oil, syrup, glycose, invert sugars, glycols and honey; and binders, e.g., gum tragacanth, sodium carboxymethylcellulose, hydroxyethylcellulose, xanthan gum, Irish moss, carragheen, starch, acacia gums, agar-agar, locust bean gum, pectin, polyalkylene glycols, polyalkylenes, silica aerogels, and petrolatum. The aforementioned optional ingredients in the dentifrice may be incorporated in the following ranges: about 0 to 70 parts carriers and softeners; about 0 to 30 parts binders; about 0 to 5 parts flavoring agents; about 0 to 60 parts water; about 0 to 10 parts buffers; about 0 to 2 parts preservatives; and about 0 to 6 parts soaps and synthetic detergents as surface tension depressants.

The dentifrice, for example, a toothpaste of this invention, may be prepared by any suitable method. In general, the dentifrice may be formed merely by blending together the aforementioned ingredients, preferably treating the abrasive with hydrofluoric acid prior to the addition of the cationic agent. Thus, in accordance with the present invention, it is now possible to form an improved dentifrice containing amorphous silica abrasives wherein more active cationic therapeutic agent is available to treat the teeth because less is adsorbed onto the silica abrasive.

The examples included below are submitted to illustrate but not limit this invention. Unless otherwise stated, all parts and percentages in the specification, examples and claims are based on weight.

EXAMPLE I

Part A 0.131 percent of hydrofluoric acid was added to a slurry of 9.000 percent Syloid 63, 9.000 percent Syloid 620, 30.000 percent sorbitol (70 percent in $H_2O$) and 21.599 percent water (percentages based on weight of the total dentifrice composition). Syloid 63 and Syloid 620 are synthetic, amorphous, porous silica xerogels having average particle diameters of about 9 microns and about 20 microns respectively, supplied by the Davison Chemical Division of the W. R. Grace & Company. This mixture was allowed to react at about 22°C. for about 30 minutes.

Part B

The slurry of part A was then mixed with the following ingredients to yield a dentifrice with improved silica xerogel abrasive-cation stability and with a pH of about pH 4.

| Ingredient | Percent by Weight |
|---|---|
| Titanium dioxide | 0.500 |
| Sodium saccharin | 0.150 |
| Sodium alkyl sulfate (28.8% solution in $H_2O$) | 4.000 |
| Flavor | 0.900 |
| Glycerine | 13.000 |
| Hydroxyethyl cellulose (Grade 250G supplied by Hercules, Inc.) | 2.100 |
| "Keltrol" (a polysaccharide xanthan gum, supplied by the Kelco Company) | 0.650 |
| Indium trichloride (2.89% solution in $H_2O$) | 4.930 |
| Sodium hydroxide (4% solution in $H_2O$) | 3.740 |
| FD&C Blue No.1 (0.1% solution in $H_2O$) | 0.300 |

EXAMPLE II

Part A 0.13 percent of hydrofluoric acid was added to a slurry of 17.00 percent Zeosyl 49 and 25.00 percent distilled water (percentages based on total weight of dentifrice). Zeosyl 49 is a precipitated amorphous silica abrasive supplied by the J. M. Huber Corporation. This mixture was allowed to react at about 22°C. for about 30 minutes.

Part B

The slurry of Part A wax then mixed with the following ingredients to yield a dentifrice with a pH of about pH 3.2:

| Ingredient | Percent by Weight |
|---|---|
| Hydroxyethyl cellulose (Grade 250G supplied by Hercules, Inc.) | 0.90 |
| Saccharin | 0.30 |
| Glycerine | 35.70 |
| Polyethylene glycol (Carbowax 400 supplied by Union Carbide Company) | 5.00 |
| Indium chloride | 0.40 |
| Blue dye solution (1%) | 0.03 |
| Flavor | 1.20 |
| Sodium lauryl sulfate | 1.26 |
| Acetic acid (buffer) | to pH 3.2 |
| Water | balance |

EXAMPLE III

Part A 0.13 percent of hydrofluoric acid was added to a slurry of 9.00 percent of Syloid 63, 9.00 percent of Syloid 74, 25.00 percent of Sorbitol (70 percent solution in $H_2O$), and 10.00 percent water (percentages based on weight of the total dentifrice composition). Syloid 63 and Syloid 74 are synthetic, amorphous, porous xerogels having average particle diameters of about 9 microns and about 8 microns, respectively, supplied by the Davison Chemical Division of the W. R. Grace & Company. This mixture was allowed to react at about 22°C. for about 30 minutes.

Part B

The slurry of Part A was then mixed with the following ingredients to yield a dentifrice with improved silica xerogel abrasive-cation stability and with a pH of about pH 3.2:

| Ingredient | Percent by Weight |
|---|---|
| Titanium dioxide | 0.50 |
| Sodium saccharin | 0.28 |
| Calcium chloride | 2.50 |
| Flavor | 0.85 |
| Glycerine | 13.00 |
| "Keltrol" (a polysaccharide xanthan gum supplied by the Kelco Company) | 1.10 |
| Indium trichloride (2.89% solution in $H_2O$) | 6.00 |
| Igepon TC-42 (25% solution in $H_2O$, a surfactant supplied by Elanco Division of Eli Lilly Co.) | 7.00 |
| Sodium hydroxide (10% solution in $H_2O$) | 0.45 |
| Color | 0.30 |
| Polyoxyethylene (20) sorbitan monoisostearate | 1.00 |
| Distilled water | balance |

EXAMPLE IV

Part A 0.046 percent of hydrofluoric acid was added to a slurry comprising 17.00 percent Syloid 63, 1.50 percent of a 2 Normal hydrochloric acid solution, and 25.00 percent distilled water (percentages based on total weight of the dentifrice). Syloid 63 is a synthetic, amorphous, porous xerogel having an average particle size of about 9 microns, supplied by the Davison Chemical Division of the W. R. Grace & Company. This mixture was allowed to react at about 22°C. for about 30 minutes.

Part B

The slurry of Part A was then mixed with the following ingredients to yield a dentifrice with improved silica xerogel abrasive-cation stability and with a pH of about pH 3.4:

| Ingredient | Percent by Weight |
|---|---|
| Titanium dioxide | 0.20 |
| Hydroxyethyl cellulose (Grade 250G supplied by Hercules, Inc.) | 0.90 |
| Saccharin | 0.30 |
| Glycerine | 35.70 |
| Polyethylene glycol (Carbowax 400 supplied by Union Carbide Company) | 5.00 |
| Indium chloride | 0.40 |
| Blue dye solution (1%) | 0.03 |
| Flavor | 1.20 |
| Sodium lauryl sulfate | 1.26 |
| Sodium fluoride | 0.176 |
| Water | balance |

This example illustrates that part of the fluoride ion in the dentifrice may be added in the form of hydrofluoric acid in Part A and part in the form of sodium fluoride (or optionally stannous fluoride or another soluble fluoride salt) in Part B. The hydrochloric acid of Part A was added to insure sufficiently acidic conditions for abrasive pretreatment. The resulting therapeutic dentifrice contains both a pretreated abrasive which is compatible with cationic therapeutic agents and fluoride ion (from the soluble fluoride salt of Part B) which will not react with the abrasive. This is a most preferred embodiment of the present invention because both cationic therapeutic agent and fluoride ion are available for treatment of the teeth.

EXAMPLE V

As in Example IV, this example illustrates a dentifrice where fluoride is partially added as HF for abrasive treatment and partially added as a non-reactive salt such as sodium fluoride for activity retention. An additional acid, acetic or hydrochloric, is added to the pretreatment solution to insure a sufficiently acidic medium during the treatment process. Hydrofluoric acid concentrations of as low as trace amounts may be used for treatment, while the remainder of the fluoride up to the toxicity limit may be added as a soluble fluoride salt. In this manner, greater free fluoride retention is effected while abrasive compatibility is not compromised, and this is a most preferred embodiment of the present invention.

Part A 0.0456 percent of hydrofluoric acid was added to a slurry of 9.0 percent Syloid 63, 9.0 percent Syloid 620, 0.5 percent titanium dioxide, 21.294 percent water, 1.5 percent of a 2 Normal hydrochloric acid solution, and 30.0 percent of a 70.0 percent sorbitol solution (percentages based on weight of total dentifrice composition). Syloid 63 and Syloid 620 are synthetic, amorphous, porous silica xerogels having average particle diameters of about 9 microns and about 20 microns, respectively, supplied by the Davison Chemical Division of the W. R. Grace & Company. This mixture was allowed to react at about 22°C. for about 30 minutes.

Part B

The slurry of Part A was then mixed with the following ingredients to yield a dentifrice with improved silica xerogel abrasive-cation stability and with a pH of about pH 3.4:

| Ingredient | Percent by Weight |
| --- | --- |
| Sodium saccharin | 0.150 |
| Sodium alkyl sulfate (28.8% solution in H$_2$O) | 4.000 |
| Flavor | 0.900 |
| Glycerine | 13.000 |
| Hydroxyethyl cellulose (Grade 250G, supplied by Hercules, Inc.) | 2.100 |
| "Keltrol" (a polysaccharide xanthan gum supplied by the Kelco Company) | 0.650 |
| Sodium fluoride | 0.176 |
| Color | 0.300 |
| Distilled water | balance |

What is claimed is:

1. A dentifrice composition comprising:
   A. from about 10 to about 50 percent of an amorphous silica abrasive having an average particle size of from 2 to about 30 microns which has been reacted with up to 0.13 percent by weight of said composition of hydrofluoric acid at a pH of less than about pH 4;
   B. an effective amount of a cationic therapeutic agent; and
   C. water.

2. A dentifrice of claim 1 wherein the cationic therapeutic agent is a therapeutic metallic cation.

3. A dentifrice of claim 2 wherein the amorphous silica is a synthetic, amorphous, porous silica xerogel.

4. A dentifrice of claim 3 wherein the cationic therapeutic agent comprises a metal ion selected from the group consisting of stannous ion, indium ion, and calcium ion.

5. A dentifrice of claim 4 having a pH of from about pH 3 to about pH 5.

6. A dentifrice of claim 2 containing, in addition, a physiologically safe amount of a soluble fluoride salt selected from the group consisting of sodium fluoride and stannous fluoride.

7. A dentifrice of claim 6 wherein the abrasive has been treated with about 0.07 percent by weight of said composition of hydrofluoric acid and the soluble fluoride salt is present at a level of about 0.18 percent.

* * * * *

UNITED STATES PATENT OFFICE
CERTIFICATE OF CORRECTION

PATENT NO. : 3,862,307
DATED : January 21, 1975
INVENTOR(S) : David N. DiGiulio

It is certified that error appears in the above-identified patent and that said Letters Patent are hereby corrected as shown below:

Col. 3, line 58, "23 lb./ft.$^2$" should be -- 23 lb./ft.$^3$ --.

Col. 5, line 28, "preheated" should be -- pretreated --.

Col. 6, line 27, after "percent", second instance, insert -- solution --.

Col. 5, line 61, "glycerin" should be -- glycerine --.

Col. 9, line 20, after numeral 10 insert -- percent --.

Signed and Sealed this thirtieth Day of September 1975

[SEAL]

Attest:

RUTH C. MASON
Attesting Officer

C. MARSHALL DANN
Commissioner of Patents and Trademarks